3,277,089
ACETYLKETENE O,N-ACETALS
James C. Martin, Kingsport, Tenn., assignor to Eastman Kodak Company, Rochester, N.Y., a corporation of New Jersey
No Drawing. Filed Oct. 9, 1963, Ser. No. 314,887
4 Claims. (Cl. 260—247.7)

This invention relates to novel chemical compounds and to a method of preparing them and more particularly to acetylketene O,N-acetals and to their preparation by combining a ketene with a ketene O,N-acetal having at least one α-hydrogen atom.

The method of the invention and the compounds prepared by it can be represented by the equation:

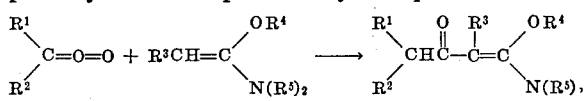

The substituents $R^1$, $R^2$ and $R^3$ of the ketene and the ketene O,N-acetal, taken singly, can be selected from a board class of monovalent substituents including, hydrogen, halogen atoms, and organic radicals having up to about 8 carbon atoms that are free of liable hydrogen atoms, e.g., as in amino and hydroxyl groups. These can include, for example, such monovalent organic radicals as: alkyl and cycloalkyl, particularly lower alkyl, cyclopentyl and cyclohexyl; phenyl and phenyl substituted with one or more lower alkyl or lower alkoxy radicals; thienyl; alkenyl, particularly lower alkenyl; and carbolkoxy. Taken collectively, $R^1$ and $R^2$ of the ketene can also be an alkylene radical that forms with the carbon to which $R^1$ and $R^2$ are attached a 4 to 6 membered carbocyclic ring, e.g., as in cyclopentane and cyclohexane. Preferably $R^1$ and $R^2$ are hydrogen, lower alkyl or lower alkylene.

$R^4$ of the ketene O,N-acetal is a monovalent hydrocarbon radical free of non-aromatic unsaturation and having up to about 6 carbon atoms, such as lower alkyl, cycloalkyl, or phenyl.

The amino substituents $R^5$ of the ketene O,N-acetal taken singly, are monovalent hydrocarbon radicals of up to about 8 carbon atoms which are free of non-aromatic unsaturation, e.g., alkyl, cycloalkyl, phenyl, and lower alkyl-substituted phenyl. Taken collectively, the substituents $R^5$ can be the atoms necessary to complete a heterocyclic ring with the nitrogen atom, e.g., piperidino, morpholino, thiamorpholino, pyrrolidinyl, etc.

Typical examples of ketenes of the formula, $R^1R^2C=C=O$, that can be employed in the reaction include ketene, methylketene, ethylketene, n-propylketene, isopropylketene, n-butylketene, isobutylketene, phenylketene, dimethylketene, ethylmethylketene, diethylketene, n-butylethylketene, di-n-propylketene, diisobutylketene, di-n-butylketene, di-n-heptylketene, ethyldodecylketene, dioctadecylketene, camphoketene, dibenzylketene, ditolylketene, diallylketene, dicarbethoxyketene, dichloroketene, tetramethyleneketene, pentamethyleneketene, diphenylketene, methylphenylketene, allylmethylketene, methylcarbethoxyketene, ethylcarbethoxyketene, n-propylcarbomethoxyketene, and the like.

An important characteristic of the method of the invention is that the ketene O,N-acetal must have at least one hydrogen atom on the α-carbon atom. Such ketene O,N-acetals of the formula,

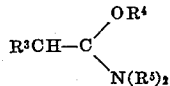

which are suitable for the method of the invention are disclosed by Meerwein et al, Ann. 641, 9 (1961).

Examples include:
1-ethoxy-N,N-dimethylvinylamine,
1-(1-methoxyvinyl)piperidine,
1-(1-butoxyvinyl)morpholine,
N,N-dibutyl-1-butoxyvinylamine,
1-ethoxy-N,N-dimethyl-1-prophenylamine,
1-ethoxy-N,N-dimethyl-2-phenylvinylamine,
1-ethoxy-N,N-diisopropyl-2-phenylvinylamine,
1-ethoxy-N,N-dimethyl-1-butenylamine,
1-ethoxy-N,N-dimethyl-1-decenylamine,
1-ethoxy-N-methyl-N-phenylvinylamine, etc.

In the practice of the invention, I normally use an equimolar ratio of ketene to ketene O,N-acetal although an excess of acetal is sometimes beneficial. The reaction can be carried out over a wide range of temperatures at which the reaction mixture is liquid, e.g., from about −20° C. to 200° C. but temperatures of 25 to 180° C. are preferred.

For the lower members of the series of reactants the reaction is quite exothermic. Therefore it is usually desirable, though not essential, to use a solvent. An important characteristic of my method is that the reaction is carried out either without a solvent or with a particular class of solvents, i.e., inert solvents that are either non-polar or of low polarity. Specifically, the suitable inert solvents are those having dielectric constants ($\epsilon$) not greater than 20 when measured at 25° C. and audio frequency, i.e., 20 to 20,000 cycles per second as reported by A. A. Maryott and E. R. Smith in "Table of Dielectric Constants of Pure Liquids," National Burea of Standards Circular 514, August 10, 1951. I have found that when a highly polar solvent is employed the predominant or sole reaction product is a cyclic compound resulting from the 2:1 addition of the ketene and the O,N-acetal. Such cyclic compounds can be obtained as a minor by-product of the present method. However, in accordance with the present invention, the open chain acetyl O,N-acetals are obtained as the major product by carrying out the reaction in the absence of a solvent having a dielectric constant greater than 20 to 25° C. Highest yields of the open chain 1:1 addition product of the present invention are obtained with solvents having a dielectric constant less than 10 as measured at 25° C.

Examples of suitable non-polar or low polarity solvents for use in the method of the invention include hydrocarbons such as hexane, benzene, toluene and xylene; chlorinated hydrocarbons such as carbon tetrachloride and methylene chloride; and non-polar or low polarity oxygenated compounds such as dioxane, ethyl ether, ethyl acetate, butyl ether, isobutyl acetate, and the like.

Both reactants can be added simultaneously to the reaction vessel or the ketene can be added to the ketene O,N-acetal. I generally avoid the inverse addition because ketene polymers are sometimes produced when the O,N-acetal is added to the ketene.

The following examples illustrate the preparation of compounds in accordance with the invention.

Example 1

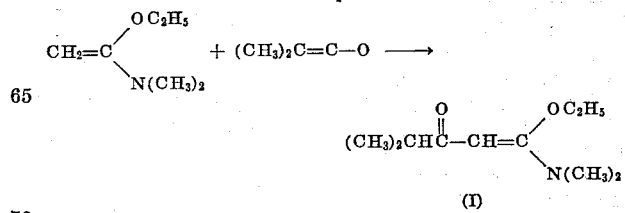

To a stirred solution of 27.3 g. (0.24 mole) of 1-ethoxy-N,N-dimethylvinylamine in 100 ml. of benzene under nitrogen was added slowly 21.7 g. (0.31 mole) of dimethylketene. The reaction was exothermic and the temperature was kept in the range 20 to 50° by an ice bath. The reaction solution was distilled through a spinning band column to give 23.5 g. of 1-dimethylamino-1-ethoxy-4-methyl-1-penten-3-one (I), B.P. 80° (0.5 mm.), $n_D^{20}$ 1.5048, together with some of a cycle compound (II) derived from 2 molecules of dimethylketene and 1 molecule of 1-ethoxy-N,N-dimethylvinylamine.

Anal. of (I).—Calcd. for $C_{10}H_{19}NO_2$: C, 64.9; H, 10.3; N, 7.6; mol wt., 185. Found: C, 64.8; H, 10.4; N, 7.3; mol wt. (B.P. in benzene), 186. The infrared spectrum of (I) showed strong absorptions at 6.16, 6.5, 6.75, 6.85 and 7.0μ. The proton magnetic resonance spectrum (as determined on a Varian 40 mc. Model V4300B instrument) showed the following peaks (c.p.s. relative to water as an external standard); 18

(—CH=C<);

quartet center at 39 (—CH$_2$); 84

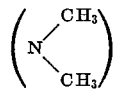

heptet at 105 (single proton in isopropyl group); triplet at 144 (CH$_3$ of ethyl group); doublet at 157 (CH$_3$'s of isopropyl group).

*Example 2*

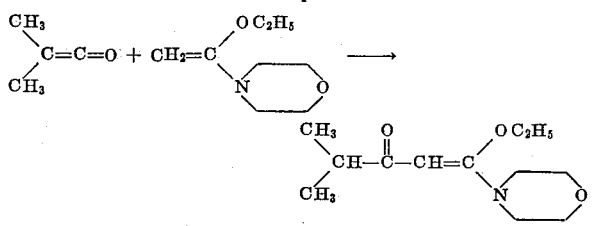

Under the general conditions of Example 1, 15.7 g. of 4-(1-ethoxyvinyl)morpholine and 7.0 g. of dimethylketene in 75 ml. of ethyl ether gave 12.3 g. of 1-ethoxy-4-methyl-1-morpholino-1-penten-3-one, B.P. 106–111° (0.4 mm.). The infrared spectra agreed with the structure shown above.

The next example illustrates the practice of the method of the invention in the absence of a solvent. The reactants are simply admixed, preferably in about equimolar proportions, and heated to reaction temperature for about 1 to 5 hours. Higher temperatures are used for the higher molecular weight reactants, e.g., 150 to about 200° C. being used for butylethylketene as in the following example, in order to obtain adequate yields in a relatively short time. Preferably the reaction is carried out in an inert atmosphere, e.g., under a blanket of nitrogen, to prevent formation of explosive peroxides.

*Example 3*

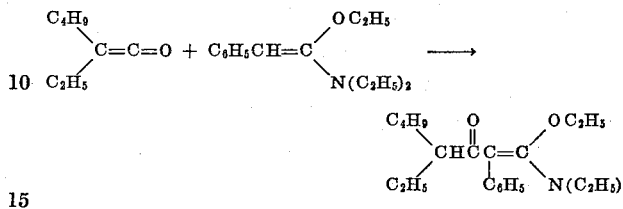

A mixture of 1.26 g. (0.01 mole) of butylethylketene and 2.19 g. (0.01 mole) of β-ethoxy-N,N-diethylstyryl amine is heated at 150° for 4 hr. under nitrogen to give a good yield of crude 1-ethoxy-4-ethyl-1-diethylamino-2-phenyl-1-octen-3-one.

*Example 4*

Under the general conditions of Example 1, the following ketenes and ketene O,N-acetals give the products shown:

| Ketene | Ketene O,N-Acetal | Product |
|---|---|---|
| $\begin{array}{c}C_4H_9\\ \diagdown\\ \phantom{C_2H_5}C=C=O\\ \diagup\\ C_2H_5\end{array}$ | $\begin{array}{c}\phantom{CH_2}\diagup OCH_3\\ CH_2=C\\ \phantom{CH_2}\diagdown N(CH_3)_2\end{array}$ | $\begin{array}{c}C_4H_9\phantom{CH}\phantom{C}O\phantom{C}OCH_3\\ \diagdown\phantom{C}\parallel\diagup\\ CHCCH=C\\ \diagup\phantom{CCCCCC}\diagdown\\ C_2H_5\phantom{CCCCC}N(CH_3)_2\end{array}$ |
| $(C_6H_5)_2C=C=O$ | $\begin{array}{c}\phantom{C_4H_9CH=}\diagup OC_2H_5\\ C_4H_9CH=C\phantom{---}CH_2-CH_2\\ \phantom{CCCCCCCC}\diagdown N\diagup\phantom{CC}\mid\\ \phantom{CCCCCCCCCCCC}CH_2-CH_2\end{array}$ | $\begin{array}{c}\phantom{CCCC}O\phantom{CCC}OC_2H_5\\ \phantom{CCC}\parallel\diagup\\ (C_6H_5)_2CHCC=C\phantom{---}CH_2-CH_2\\ \phantom{CCCCCCCCCCC}\mid\diagdown N\diagup\mid\\ \phantom{CCCCCCCCCCC}C_4H_9\phantom{C}CH_2-CH_2\end{array}$ |
| $(C_8H_{17})_2C=C=O$ | $\begin{array}{c}\phantom{CH_2=}\diagup OC_4H_9\\ CH_2=C\\ \phantom{CH_2=}\diagdown N(CH_3)_2\end{array}$ | $\begin{array}{c}\phantom{CCCC}O\phantom{CCC}OC_4H_9\\ \phantom{CCCC}\parallel\diagup\\ (C_8H_{17})_2CHCCH=C\\ \phantom{CCCCCCCCCC}\diagdown N(CH_3)_2\end{array}$ |
| $\begin{array}{c}CH_2-CH_2\\ \diagup\phantom{CC}\diagdown\\ CH_2\phantom{CCCC}C=C=O\\ \diagdown\phantom{CC}\diagup\\ CH_2-CH_2\end{array}$ | $\begin{array}{c}\phantom{CH_2=}\diagup OC_2H_5\\ CH_2=C\\ \phantom{CH_2=}\diagdown N(CH_3)_2\end{array}$ | $\begin{array}{c}CH_2-CH_2\phantom{CCC}O\phantom{CCC}OC_2H_5\\ \diagup\phantom{CCC}\diagdown\phantom{CCC}\parallel\diagup\\ CH_2\phantom{CCCC}CH-CCH=C\\ \diagdown\phantom{CCC}\diagup\phantom{CCCCCCCCC}\diagdown\\ CH_2-CH_2\phantom{CCCCCCCC}N(CH_3)_2\end{array}$ |

The novel compounds of the invention are useful principally as chemical intermediates. For example, they react with hydrazine to form pyrazoles which have a number of uses. For example, the pyrazoles can be employed as antioxidant additives for mineral lubricating oils in the manner of U.S. 2,971,912 or as stabilizers for poly(vinyl chloride) resins in the manner of U.S. 2,946,765.

The following example illustrates the preparation of such a substituted pyrazole from a product of the invention.

*Example 5*

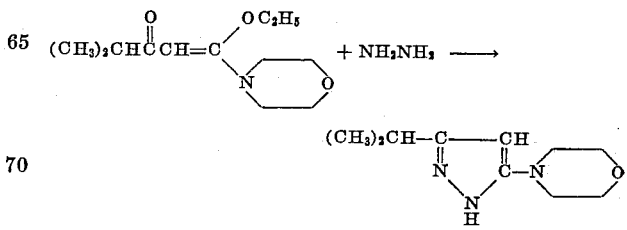

A solution of 0.64 g. (0.02 mole) of anhydrous hydrazine and 4.54 g. (0.02 mole) of 1-ethoxy-4-methyl-1-morpholino-1-penten-3-one in 20 ml. of ethanol was refluxed for 8 hr. The reaction solution was stripped of low boilers under vacuum. The viscous residue crystallized slowly and was recrystallized from a mixture of hexane and benzene to give 3.1 g. of 3-isopropyl-5-morpholino-pyrazole, M.P. 66–68°.

Although the invention has been described in considerable detail with particular reference to certain preferred embodiments thereof, it will be understood that variations and modifications can be effected within the spirit and scope of the invention as described hereinabove and as defined in the appended claims.

I claim:

1. A compound of the formula,

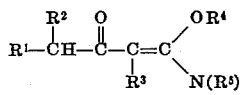

wherein $R^1$, $R^2$ and $R^3$, taken singly, are alkyl, cycloalkyl, phenyl, lower alkyl-substituted phenyl, lower alkoxy-substituted phenyl, thienyl, alkenyl and carbalkoxy of up to 8 carbon atoms and, taken collectively, said $R^1$ and $R^2$ form a 4 to 6 membered saturated carbocyclic ring with the common carbon to which they are attached; wherein $R^4$ is alkyl, cycloalkyl or phenyl of up to 6 carbon atoms; wherein the substituents $R^5$, taken singly, are alkyl, cycloalkyl, phenyl or lower alkyl-substituted phenyl of up to 8 carbon atoms and, taken collectively, represent the atoms necessary to complete a heterocyclic ring selected from the group consisting of piperidino, morpholino, thiamorpholino, and pyrrolydinyl.

2. 1-dimethylamino-1-ethoxy-4-methyl-1-penten-3-one.
3. 1-ethoxy-4-methyl-1-morpholino-1-penten-3-one.
4. 1 - ethoxy - 4 - ethyl - 1 - diethylamino - 2 - phenyl-1-octen-3-one.

References Cited by the Examiner

UNITED STATES PATENTS 3,141,880  7/1964  Martin _____ 260—294.75

OTHER REFERENCES

Hasek et al., J. Org. Chem., vol. 26, pp. 4775 to 4776 (61).
Opitz et al., Agnew Chem., vol. 74, p. 32 (62).
Hasek et al., J. Org. Chem., vol. 28, pp. 1468 to 1474 (63).

WALTER A. MODANCE, *Examiner.*

AVROM D. SPEVACK, *Assistant Examiner.*